(12) United States Patent
Nadim et al.

(10) Patent No.: US 11,514,258 B2
(45) Date of Patent: Nov. 29, 2022

(54) TABLE HEADER DETECTION USING GLOBAL MACHINE LEARNING FEATURES FROM ORTHOGONAL ROWS AND COLUMNS

(71) Applicant: International Business Machines Corporation, Armonk, NY (US)

(72) Inventors: Hassan Nadim, San Francisco, CA (US); Andrew R. Freed, Cary, NC (US); Joshua S. Allen, Durham, NC (US); Kyle G. Christianson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 16/136,757

(22) Filed: Sep. 20, 2018

(65) Prior Publication Data
US 2020/0097759 A1   Mar. 26, 2020

(51) Int. Cl.
G06F 15/16 (2006.01)
G06K 9/62 (2022.01)
G06N 20/00 (2019.01)
G06F 40/177 (2020.01)
G06V 30/412 (2022.01)

(52) U.S. Cl.
CPC ......... *G06K 9/6215* (2013.01); *G06F 40/177* (2020.01); *G06N 20/00* (2019.01); *G06V 30/412* (2022.01)

(58) Field of Classification Search
CPC .............. G06K 9/6215; G06K 9/00449; G06F 40/177; G06F 40/258; G06N 20/00
See application file for complete search history.

(56) References Cited

U.S. PATENT DOCUMENTS

| | | |
|---|---|---|
| 5,604,854 A | 2/1997 | Glassey |
| 6,510,420 B1 | 1/2003 | Cessna et al. |
| 7,054,871 B2 | 5/2006 | Hu et al. |
| | (Continued) | |

OTHER PUBLICATIONS

Wang, et al. Understanding Tables on the Web. International Conference on Conceptual Modeling. 2012, pp. 141-155. (Year: 2012).*

(Continued)

*Primary Examiner* — Alex Gofman
*Assistant Examiner* — Shelly X Qian
(74) *Attorney, Agent, or Firm* — Terrile, Cannatti & Chambers, LLP; Emmanuel A. Rivera (57) ABSTRACT

A method, system and computer-usable medium for detecting headers in various documents, such as PDF and HTML files. The files are converted to a two dimensional array or table, having orthogonal rows and columns. Either rows or columns are determined to include headers. For determining if rows include headers. For each row in the array or table, pair wise comparison is performed for each cell of each column that is orthogonal to that row. The pair wise comparison scores or values are summed up for each orthogonal column to that row and the sum across for all the orthogonal columns to row provide a score or value for that row. Row scores are evaluated relative to one another to determine likelihood of headers in the row. For determining if columns have headers, similar calculation is performed between columns and their orthogonal rows.

20 Claims, 7 Drawing Sheets

(56) References Cited

U.S. PATENT DOCUMENTS

| | | | |
|---|---|---|---|
| 7,089,492 B2 | 8/2006 | Anderson | |
| 7,415,481 B2 | 8/2008 | Becker et al. | |
| 7,594,165 B2 | 9/2009 | Chen et al. | |
| 8,335,981 B2 | 12/2012 | Naibo et al. | |
| 8,914,419 B2 | 12/2014 | Gerard et al. | |
| 9,286,290 B2 | 3/2016 | Allen et al. | |
| 9,311,371 B2 | 4/2016 | Mohan et al. | |
| 9,489,364 B2 | 11/2016 | Rosner | |
| 9,524,286 B2 | 12/2016 | Evans et al. | |
| 9,715,487 B2 | 7/2017 | Rapp | |
| 9,734,181 B2 | 8/2017 | Wang et al. | |
| 9,785,830 B2 | 10/2017 | Hausmann et al. | |
| 9,940,380 B2 | 4/2018 | Fourny et al. | |
| 10,235,437 B2 | 3/2019 | Diwan et al. | |
| 10,706,218 B2 | 7/2020 | Milward et al. | |
| 2003/0097384 A1 | 5/2003 | Hu et al. | |
| 2005/0268222 A1 | 12/2005 | Chang | |
| 2006/0117051 A1 | 6/2006 | Chin | |
| 2006/0156221 A1 | 7/2006 | Chen et al. | |
| 2007/0288412 A1 | 12/2007 | Linehan | |
| 2009/0044090 A1 | 2/2009 | Gur et al. | |
| 2009/0313205 A1* | 12/2009 | Hino | G06F 40/14 706/54 |
| 2011/0289398 A1 | 11/2011 | Chin | |
| 2012/0303630 A1 | 11/2012 | Gelfand | |
| 2014/0040806 A1 | 2/2014 | Anderson et al. | |
| 2014/0108906 A1 | 4/2014 | Kelley et al. | |
| 2014/0369602 A1* | 12/2014 | Meier | G06K 9/6218 382/182 |
| 2015/0007010 A1 | 1/2015 | Byron et al. | |
| 2015/0379057 A1 | 12/2015 | Wang et al. | |
| 2016/0292240 A1 | 10/2016 | Diwan et al. | |
| 2017/0329749 A1 | 11/2017 | Milward et al. | |
| 2017/0371955 A1 | 12/2017 | Allen et al. | |
| 2018/0060292 A1 | 3/2018 | Rullan et al. | |
| 2019/0138588 A1 | 5/2019 | Silk et al. | |
| 2019/0340240 A1 | 11/2019 | Duta | |
| 2019/0370540 A1* | 12/2019 | Freed | G06K 9/00469 |
| 2020/0097541 A1 | 3/2020 | Christianson et al. | |

OTHER PUBLICATIONS

Ferrucci et al. Building Watson: An Overview of the DeepQA Project. AI Magazine, 2010, pp. 1-26. (Year: 2010).*

Fang, et al. Table Header Detection and Classification. AAAI Conference on Artificial Intelligence, 2012, pp. 599-605. (Year: 2012).*

Li et al. A Normalized Levenshtein Distance Metric. IEEE Transactions on Pattern Analysis and Machine Intelligence, 26:6, 2007, pp. 1091-1095. (Year: 2007).*

Li et al. A Normalized Levenshtein Distance Metric. IEEE Transactions on Pattern Analysis and Machine Intelligence, 29:6, 2007, pp. 1091-1095. (Year: 2007).*

Raschka. About Feature Scaling and Normalization—and the effect of standardization for machine learning algorithms. https://sebastianraschka.com/Articles/2014_about_feature_scaling.html, 2014, pp. 1-20. (Year: 2014).*

Correa et al. Unleashing Tabular Content to Open Data: A Survey on PDF Table Extraction Methods and Tools, dg.o'17, pp. 1-10. (Year: 2017).*

Teacher's Tech, Mar. 19, 2018, (https://www.youtube.com/watch?v=k1VUZEVuDJ8).

Cheusheva, Svetlana, "How to convert Excel tables to HTML" Sep. 11, 2018, https://www.ablebits.com/office-addins-blog/2014/03/21/convert-excel-html/.

CCR Data Ltd., "Data Cleansing—Deduplication in Excel" Jan. 26, 2012, (https://www.youtube.com/watch?v= 6H NX_tk2VxU).

Contextures Inc., "Change Horizontal Data to Vertical" Jan. 8, 2011, (https://www.youtube.com/watch?v=ZWu5MetlwlE).

Wikipedia, Contingency Table, May 28, 2018.

Wikipedia, Pivot Table, May 28, 2018, Jun. 20, 2018.

Jim Gray et al., "Data cube: A relational aggregation operator generalizing group-by, cross-tab, and sub-totals," Data mining and knowledge discovery 1, No. 1 (1997): 29-53.

Jianying Hu et al., "Table structure recognition and its evaluation," In Document Recognition and Retrieval VIII, vol. 4307, pp. 44-56. International Society for Optics and Photonics, 2000.

David W. Embley et al., "Table-processing paradigms: a research survey," International Journal of Document Analysis and Recognition (IJDAR) 8, No. 2-3 (2006): 66-86.

docparser.com, "How to parse tables with complex layouts?" printed Jul. 9, 2018, https://support.docparser.com/article/1312-how-to-parse-tables-with-complex-layouts.

Svitlana Vakulenko et al., "TableQA: Question Answering on Tabular Data," Aug. 30, 2017, https://arvix.org/pdf/1705.06504.pdf.

Ana Costa E Silva et al., Design of an end-to-end method to extract information from tables, International Journal of Document Analysis and Recognition (IJDAR) 8, No. 2-3 (2006): 144-171.

Chris West, JavaScript Snippet—Convert HTML Table to 2D Array, Chris West's Blog, http://cwestblog.com/2016/08/21/javascript-snippet-convert-html-table-to-2d-array/, Aug. 21, 2016.

Sharad Seth et al., "Analysis and taxonomy of column header categories for web tables," Proceedings of the 9th IAPR International Workshop on Document Analysis Systems (DAS '10). ACM, New York, NY, USA, 81-88.

George Nagy et al., "Data extraction from web tables: The devil is in the details," Document Analysis and Recognition (ICDAR), 2011 International Conference on, pp. 242-246. IEEE, 2011.

experts-exchange.com, convert html table into an array, https://www.experts-exchange.com/questions/21911184/convert-html-table-into-an-array.html, printed Sep. 4, 2018.

Rob High, "The Era of Cognitive Systems: An Inside Look at IBM Watson and How it Works," IBM Redbooks, 2012.

Michael Yuan et al., "Watson and Healthcare," IBM developerWorks, 2011.

IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber-6177717.

Sebastian Raschka, About Feature Scaling and Normalization—and the effect of standardization for machine earning algorithms, https://sebastianraschka.com/Articles/2014_about_feature_scaling.html, Jul. 11, 2014.

Mitch Sanders, Machine Learning Pre-Processing: Scaling, Standardizing, Normalizing, http://datareality.blogspot.com/2016/11/scaling-normalizing-standardizing-which.html. Nov. 29, 2016.

Michael J. Cafarella et al., Uncovering the Relational Web, Jun. 13, 2008 http://sirrice.github.io/files/papers/relweb-webdb08.pdf.

Jing Fang et al., Table Header Detection and Classification, Proceedings of the Twenty-Sixth AAAI Conference on Artificial Intelligence, Toronto, Ontario, Canada, Jul. 22-26, 2012 https://pdfs.semanticscholar.org/2e4c/cf5445490a176dabdf77a5e39cb11f88970c.pdf.

Jingjing Wang et al., Understanding Tables on the Web, 2012 https://homes.cs.washington.edu/~jwang/publications/webtables.pdf.

Xing Wei et al., Table Extraction for Answer Retrieval, Abstract, Inf Retrieval, vol. 9, Issue 5, pp. 589-611, Nov. 2006, https://rd.springer.com/content/pdf/10.1007%2Fs10791-006-9005-5.pdf.

George Nagy et al., End-to-End Conversion of HTML Tables for Populating a Relational Database, Abstract, 2014 11th IAPR International Workshop on Document Analysis Systems, Apr. 7-10, 2014, http://ieeexplore.ieee.org/document/6831002/.

* cited by examiner

|   | 406-1 | Beans 406-2 | Peas 406-3 | Carrots 406-4 | Tomatoes 406-5 |
|---|---|---|---|---|---|
| 304 | Melbourne 406-6 | Melbourne 406-7 | Melbourne 406-8 | Melbourne 406-9 | Melbourne 406-10 |
|  | Wholesale 406-11 | $1.20 406-12 | $1.25 406-13 | $1.20 406-14 | $1.00 406-15 |
|  | Retail 406-16 | $2.00 406-17 | $3.00 406-18 | $1.80 406-19 | $1.60 406-20 |
| 310 | Sydney 406-21 | Sydney 406-22 | Sydney 406-23 | Sydney 406-24 | Sydney 406-25 |
|  | Wholesale 406-26 | $1.20 406-27 | $1.30 406-28 | $1.00 406-29 | $0.80 406-30 |
|  | Retail 406-31 | $1.60 406-32 | $2.00 406-33 | $2.00 406-34 | $1.50 406-35 |

|   | 502 | 504 | 506 | 508 | 510 |
|---|---|---|---|---|---|
| 302 | 406-1 | string 406-2 | string 406-3 | string 406-4 | string 406-5 |
| 304 | string 406-6 | string 406-7 | string 406-8 | string 406-9 | string 406-10 |
| 306 | string 406-11 | monetary value 406-12 | monetary value 406-13 | monetary value 406-14 | monetary value 406-15 |
| 308 | string 406-16 | monetary value 406-17 | monetary value 406-18 | monetary value 406-19 | monetary value 406-20 |
| 310 | string 406-21 | string 406-22 | string 406-23 | string 406-24 | string 406-25 |
| 312 | string 406-26 | monetary value 406-27 | monetary value 406-28 | monetary value 406-29 | monetary value 406-30 |
| 314 | string 406-31 | monetary value 406-32 | monetary value 406-33 | monetary value 406-34 | monetary value 406-35 |

| | | |
|---|---|---|
| 302— | 0 | 37.14 |
| 304— | 1 | 51.43 |
| 306— | 2 | 62.86 |
| 308— | 3 | 62.86 |
| 310— | 4 | 51.43 |
| 312— | 5 | 62.86 |
| 314— | 6 | 62.86 |

FIGURE 7

| | | |
|---|---|---|
| 302— | 0 | 0.0 |
| 304— | 1 | 55.6 |
| 306— | 2 | 100.0 |
| 308— | 3 | 100.0 |
| 310— | 4 | 55.6 |
| 312— | 5 | 100.0 |
| 314— | 6 | 100.0 |

TABLE HEADER DETECTION USING GLOBAL MACHINE LEARNING FEATURES FROM ORTHOGONAL ROWS AND COLUMNS

BACKGROUND OF THE INVENTION

Field of the Invention

The present application relates generally to an improved data processing apparatus and method and more specifically for mechanisms to detect table headers of various files, such as "html," "pdf" and similar files, where header data is not obvious or readily identified. The header detection uses global machine learning from orthogonal rows and columns of configured tables.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating knowledge management systems which may take an input, analyze it, and return results indicative of the most probable results to the input. Knowledge management systems provide automated mechanisms for searching through a knowledge base with numerous sources of content, e.g., electronic documents, and analyze them with regard to an input to determine a result and a confidence measure as to how accurate the result is in relation to the input.

One such knowledge management system is the IBM Watson™ system available from International Business Machines (IBM) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA technology used for hypothesis generation, massive evidence gathering, analysis, and scoring. DeepQA takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Description of the Related Art

Certain header detection technology classifies each row of a column as either a "header" or as "data." Features of a single row or neighboring row are analyzed; however, contents of the entire table are not taken into account. This technology typically is satisfactory for simple and properly structured tables. Such technology may not be adequate for more complex tables, such as tables with embedded headers, and tables converted from other files.

Certain technology identifies relational-style tables among tables crawled on the web. Typically, such technology assumes the headers, if present, will be the first row, as in a relational databases.

Certain technology is directed to understanding or acknowledging tables in document; however does not determine or detect actual headers, and relies on standard simple tables.

SUMMARY OF THE INVENTION

A method, system and computer-usable medium for determining headers in a two dimensional (2D) array or table, with orthogonal rows and columns. For each row or column, a score or value is determined based on pair wise calculations of cells of orthogonal columns or rows to each row or column. The scores or values of the rows or columns are compared relative to one another to determine which rows or columns of the 2D array or table include headers.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
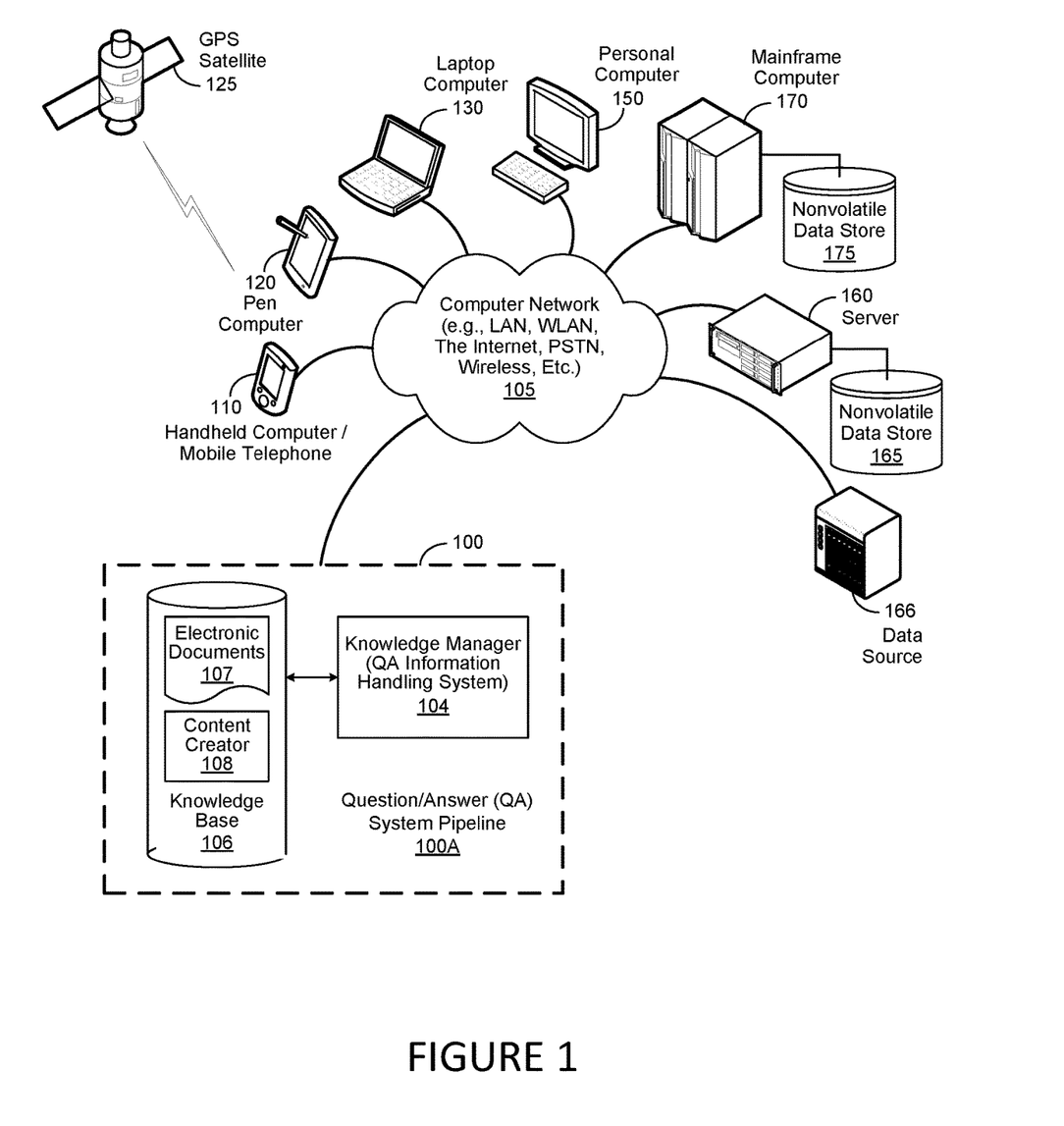
FIG. 1 depicts a network environment that includes a knowledge manager that utilizes a knowledge base.

FIG. 1 depicts a schematic diagram of one illustrative embodiment of a knowledge manager system (e.g., a question/answer (QA)) system 100 which is instantiated in a distributed knowledge manager environment 102. One example of a question/answer generation which may be used in conjunction with the principles described herein is described in U.S. Patent Application Publication No. 2011/0125734, which is herein incorporated by reference in its entirety. Knowledge manager 100 may include a knowledge manager information handling system 104 (comprising one or more processors and one or more memories, and potentially any other computing device elements generally known in the art including buses, storage devices, communication interfaces, and the like) coupled to a network 105. The environment 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and environment 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 105, a knowledge base 106 which can include a corpus of electronic documents or other data, a content creator 108, content users, and other possible sources of input. In various embodiments, the other possible sources of input can include location information. In one embodiment, some or all of the inputs to knowledge manager 100 may be routed through the network 105. The various computing devices 104 on the network 105 may include access points for content creators and content users. Some of the computing devices 104 may include devices for a database storing the corpus of data. The network 105 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 100. The document 106 may include any file, text, article, or source of data for use in knowledge manager 100. Content users may access knowledge manager 100 via a network connection or an Internet connection (represented as network 105), and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers. In various embodiments, the one or more answers take into account location information.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. In certain embodiments, the location information is determined through the use of a Geographical Positioning System (GPS) satellite 125. In these embodiments, a handheld computer or mobile telephone 110, or other device, uses signals transmitted by the GPS satellite 125 to generate location information, which in turn is provided via the network 105 to the knowledge manager system 100 for processing. As shown, the various information handling systems can be networked together using computer network 100. Types of computer network 105 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
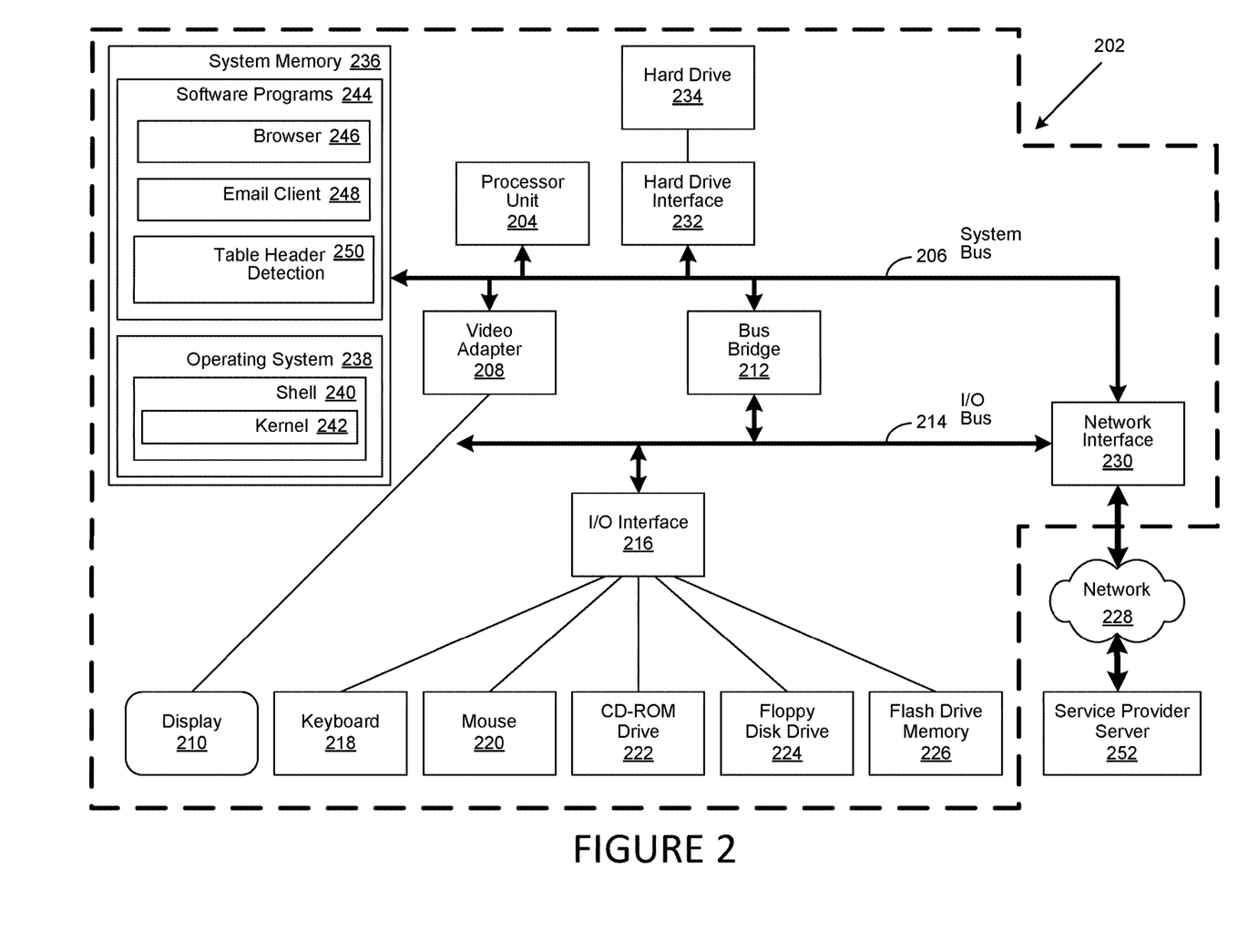
FIG. 2 is a simplified block diagram of an information handling system capable of performing computing operations.

FIG. 2 illustrates an information handling system 202, more particularly, a processor and common components, which is a simplified example of a computer system capable of performing the computing operations described herein. Information handling system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disk—Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

The information handling system 202 is able to communicate with a service provider server 252 via a network 228 using a network interface 230, which is coupled to system bus 206. Network 228 may be an external network such as the Internet, or an internal network such as an Ethernet Network or a Virtual Private Network (VPN). Using network 228, client computer 202 is able to use the present invention to access service provider server 252.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information handling system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. Software programs 244 may include a browser 246 and email client 248. Browser 246 includes program modules and instructions enabling a World Wide Web (WWW) client (i.e., information handling system 202) to send and receive network messages to the Internet using HyperText Transfer Protocol (HTTP) messaging, thus enabling communication with service provider server 252. In various embodiments, software programs 244 may also include a table header detection program 250. In these and other embodiments, the table header detection program 250 includes code for implementing the processes described herein below. In one embodiment, the information handling system 202 is able to download the table header detection program 250 from a service provider server 252.

The hardware elements depicted in the information handling system 202 are not intended to be exhaustive, but rather are representative to highlight components used by the present invention. For instance, the information handling system 202 may include alternate memory storage devices such as magnetic cassettes, Digital Versatile Disks (DVDs), Bernoulli cartridges, and the like. These and other variations are intended to be within the spirit, scope and intent of the present invention.

Figure 3:
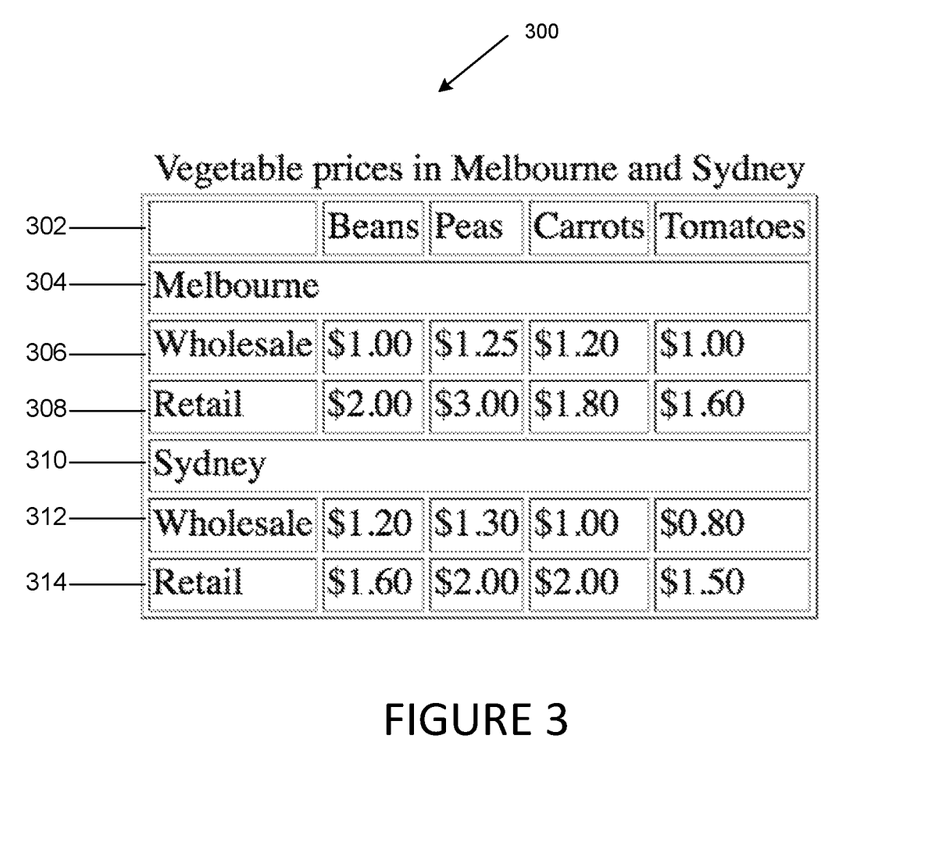
FIG. 3 is a table from a data file or document file.

FIG. 3 is a table 300 with various headers. In certain embodiments the headers are embedded and not obvious. In certain implementations, the table 300 is a file or document, such as an HTML or PDF file. In such documents or files, are headers and data; however, in certain instances the headers or header cells in such a table are not annotated or identified. Such documents and files contain valuable data with tables. In order to make use of such data, such as extracting data, searching for data, gaining valuable information from the tables, context as to headers and data is determined.

The presence of attributes, such as bold and italic font styles, font size differences, spanning cells (i.e., cells that go across a row or column), and center alignment of cells are not necessarily indicative of headers or header cells in a table. In certain instances, such as for complex tables, for example in finance or business, such guaranteed to be header cells because many complex tables, especially in the financial world, these attributes are used to highlight important values (e.g., data) in table cells. Such highlighted cells may not necessarily include headers.

As table 300 illustrates that headers can be hierarchical, horizontal or vertical and even be embedded anywhere within a table. In this example, table 300 includes row "0" 302, row "1" 304, row "2" 306, row "3" 308, row "4" 310, row "5" 312, and row "6" 314. In table 300 there are headers in row "0" 301, row "1" 304, and row "4" 310. In the example of table 300, row "1" 304 that has "Melbourne" is known as a spanning row, where the same data spans across the row. In other words, the data "Melbourne" spans across row "1" 304. Likewise, row "4" 310 which has "Sydney" is a spanning row.

In certain implementations, table 300 is received as HTML or PDF document or file. The table elements are or cells are extracted from the document or file, and a two dimensional (2-D) array is created. In other words, rows are orthogonal to columns. The created array is an orthogonal row by column table. Where there are spanning rows, the data of that row is expanded for each cell in that particular row.

Figure 4:
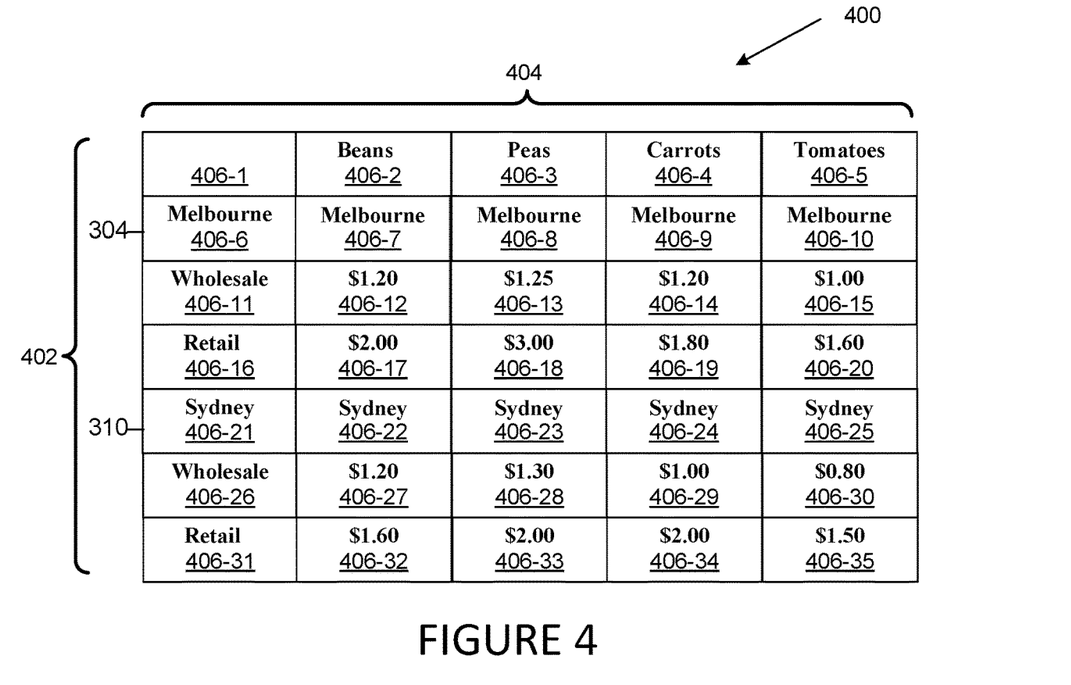
FIG. 4 is a processed orthogonal expanded table.

FIG. 4 is a table 400 that is an expanded table of the document or file containing table 300. Table 400 includes rows 402 and columns 404. Table 400 further includes cells 406. As discussed above, table 300 includes spanning row "1" 304 with "Melbourne" and spanning row "4" 306 with "Sydney." In certain embodiments, the cells in a spanning row are given the same data in the spanning row. In table 400, the cells 406-6, 406-7, 406-8, 406-9 and 406-10 of row "1" 304 contain "Melbourne." The cells 406-21, 406-22, 406-23, 406-24 and 406-25 of row "4" 306 contain "Sydney." In certain embodiments, there are spanning columns, where the same data is expanded in each column that a row spans.

Figure 5:
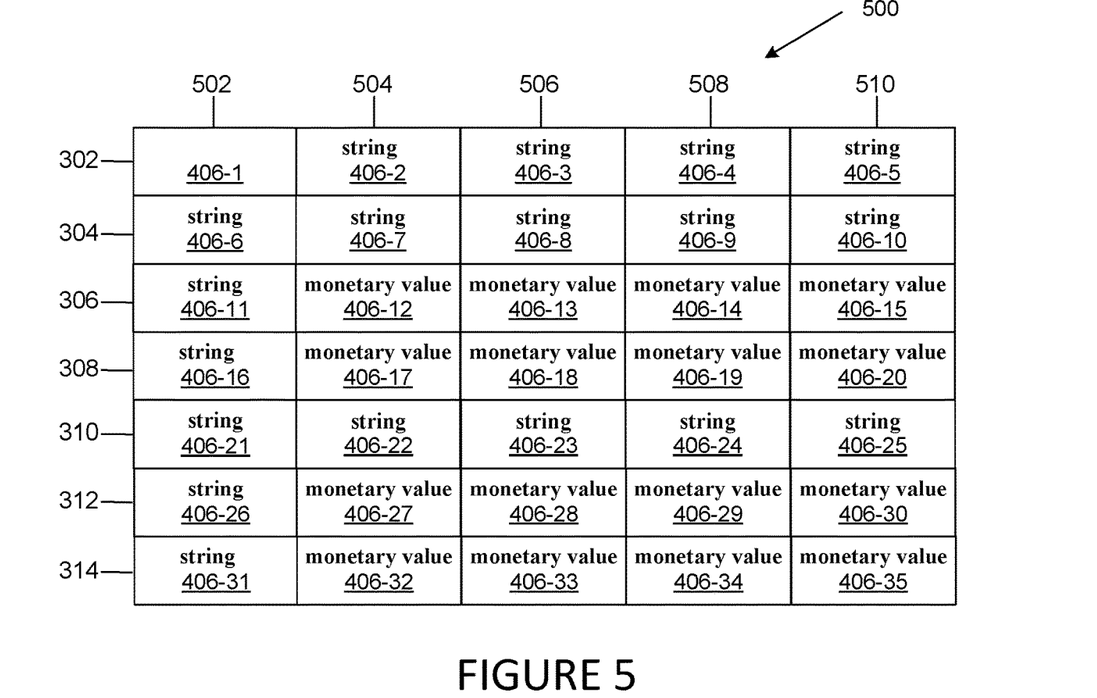
FIG. 5 is a table identifying data types of cells in the table.

In certain embodiments, the data types are identified for cells in a processed 2D orthogonal table. FIG. 5 is a table 500 that identifies the data types of table 400. Cell 406-1 contains no data, and is identified as "none" or "null." Cell 406-2 is identified as a character string or string. Cell 406-3 is identified as a string. Cell 406-4 is identified as a string. Cell 406-5 is identified as a string. Cell 406-6 is identified as a string. Cell 406-7 is identified as a string. Cell 406-8 is identified as a string. Cell 406-9 is identified as a string. Cell 406-10 is identified as a string. Cell 406-11 is identified as a string. Cell 406-12 is identified as a monetary value. Cell 406-13 is identified as a monetary value. Cell 406-14 is identified as a monetary value. Cell 406-15 is identified as a monetary value. Cell 406-16 is identified as a string. Cell 406-17 is identified as a monetary value. Cell 406-18 is identified as a monetary value. Cell 406-19 is identified as a monetary value. Cell 406-20 is identified as a monetary value. Cell 406-21 is identified as a string. Cell 406-22 is identified as a string. Cell 406-23 is identified as a string. Cell 406-24 is identified as a string. Cell 406-25 is identified as a string. Cell 406-26 is identified as a string. Cell 406-27 is identified as a monetary value. Cell 406-28 is identified as a monetary value. Cell 406-29 is identified as a monetary value. Cell 406-30 is identified as a monetary value. Cell 406-31 is identified as a string. Cell 406-32 is identified as a monetary value. Cell 406-33 is identified as a monetary value. Cell 406-34 is identified as a monetary value. Cell 406-35 is identified as a monetary value.

By identifying particular features, such as data types of the cells in a table, comparison of particular is performed based on the feature (i.e., data type). For example, a cell containing a string is compared to a cell which contains a monetary value. Data type is one example of feature. Other features of cells that can be used for comparison include, but are not limited to: fonts styles, text similarity (i.e., edit distance), cell alignments, text indentation, font sizes, font colors, number of characters, percent symbolic characters, percent numeric characters, and percent date/time/year/address/area/money/percentage cells.

In certain embodiments, instead of just counting the various features, such as data types, of cells in a single row or comparing the features/data types of corresponding cells in neighboring rows, each row is compared to all other rows of a table, allowing the ability to determine how each row compares to other rows based on a particular feature, such as a data type. Such comparison allows prediction of whether the row includes a header or data.

Figure 6:
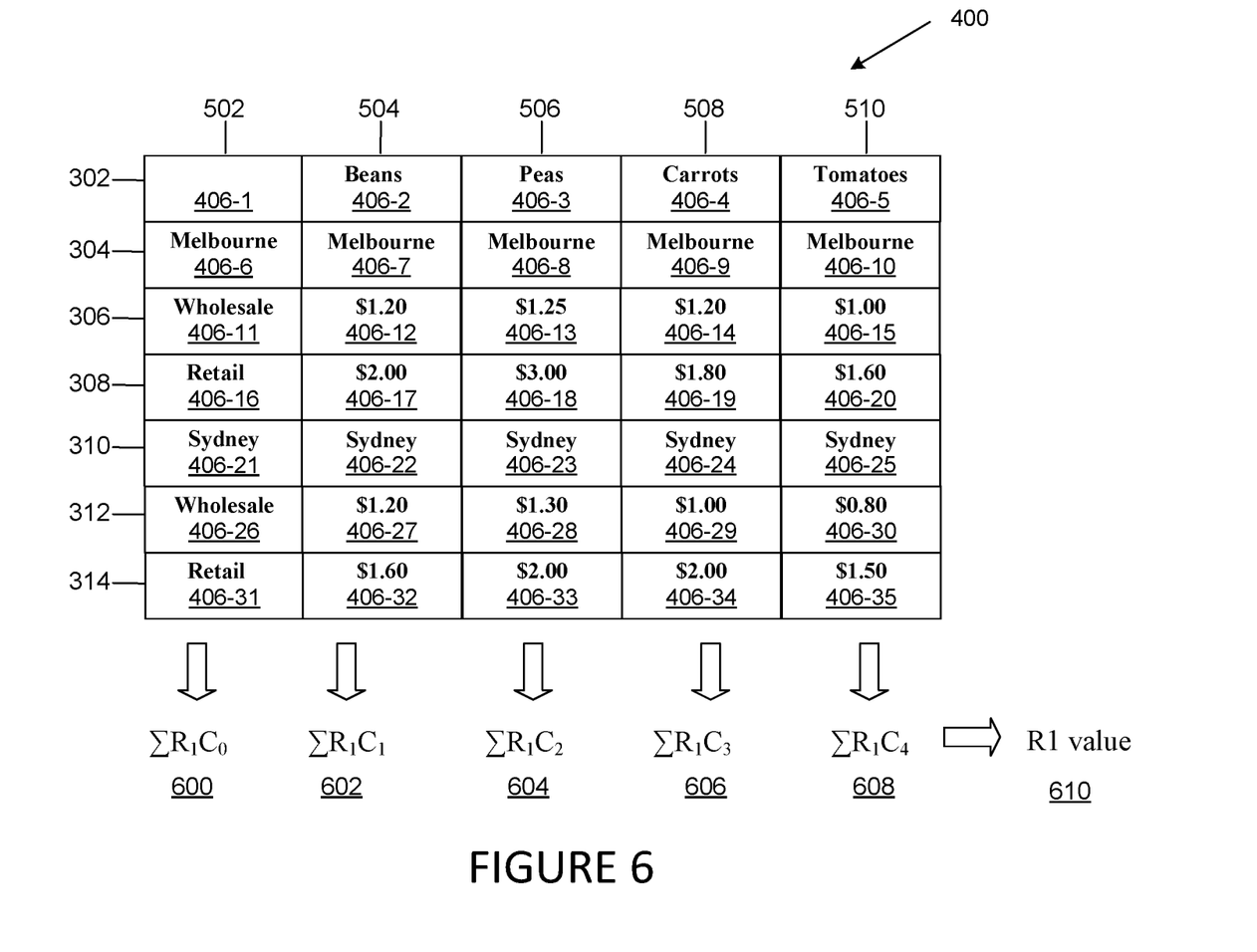
FIG. 6 is table and an example of calculation to arrive at a row value.

The following calculations are made for each row in table 500 to arrive at a value for each row to be compared with values calculated for other rows. FIG. 6 shows table 400 and an example of calculation for one of the rows to arrive at a row value. Row "1" 304 is described as an example to calculate row value in reference to FIG. 6. Similar calculations are performed for rows 302, 306, 308, 310, 312 and 314.

Row "1" 304 is orthogonal to columns 502, 504, 506, 508 and 510. For each orthogonal column to row "1" 304, a pair wise calculation is performed between the common cell on row "1" 304 and each of cells of the respective column. In certain embodiments, pair-wise comparison is global data compare, which determines a score based on the differences between cells. In other words, a determination is made as to changes required to derive the value of one cell to the value of the other cell. In certain embodiments, a Boolean comparison is made between the cells. The greater the changes, the higher the score given. In other embodiments, the use of global Levenshtein distance comparison is used to derive a score.

Therefore, for column 502, pair wise comparisons are made with cell 406-6 against cells 406-1, 406-11, 406-16, 406-21, 406-26 and 406-31. Scores are derived for the following cell pairings: 406-6 and 406-1 ("Melbourne" compared to "Null"), 406-6 and 406-11("Melbourne" compared to "Wholesale"), 406-6 and 406-16 ("Melbourne" compared to "Retail"), 406-6 and 406-21 ("Melbourne" compared to "Sydney"), 406-6 and 406-26 ("Melbourne" compared to "Wholesale"), and 406-6 and 406-31 ("Melbourne" compared to "Retail"). The pair wise comparison scores of each of the cell pairings are summed up for column 502. This summed value is represented in FIG. 6 as $\Sigma R_1 C_0$ 600.

For column 504, pair wise comparisons are made with cell 406-7 against cells 406-2, 406-12, 406-17, 406-22, 406-27 and 406-32. The pair wise comparison scores of each of the cell pairings are summed up for column 504. This summed value is represented in as $\Sigma R_1 C_1$ 602.

For column 506, pair wise comparisons are made with cell 406-8 against cells 406-3, 406-13, 406-18, 406-23, 406-28 and 406-33. The pair wise comparison scores of each of the cell pairings are summed up for column 506. This summed value is represented in as $\Sigma R_1 C_2$ 604.

For column 508, pair wise comparisons are made with cell 406-9 against cells 406-4, 406-14, 406-19, 406-24, 406-29 and 406-34. The pair wise comparison scores of each of the cell pairings are summed up for column 508. This summed value is represented in FIG. 6 as $\Sigma R_1 C_3$ 606.

For column 510, pair wise comparisons are made with cell 406-10 against cells 406-10, 406-15, 406-20, 406-25, 406-30 and 406-35. The pair wise comparison scores of each of the cell pairings are summed up for column 508. This summed value is represented in FIG. 6 as $\Sigma R_1 C_4$ 608.

After the scores of each orthogonal column to a row are determined, the scores are summed up to determine a score value for the respective row. In this example, for row "1" 304, the values $\Sigma R_1 C_0$ 600, $\Sigma R_1 C_1$ 602, $\Sigma R_1 C_3$ 606, $\Sigma R_1 C_4$ 608 are added together to arrive at a score or value for row "1" 304, as represented by R1 value 610.

Similarly, scores or values are determined for rows 302, 206, 308, 310, 312, and 314. In the calculation of row values, certain pair wise combinations of cells may reoccur. In other words, calculation of the same cell pair wise combination takes place. In certain implementations, dynamic programming is used to call up the previously determined cell pair calculation.

In certain embodiments, for rows with expanded cells, or spanning cells, such as rows 304 and 310, the summed value of the row is divided by the number of expanded cells to arrive at a normalized value. In certain implementations, the scores or values of the rows are multiplied by 100 to arrive at a percentage value. When the scores or values for all the rows are determined, the scores or values for the rows are compared.

Figure 7:
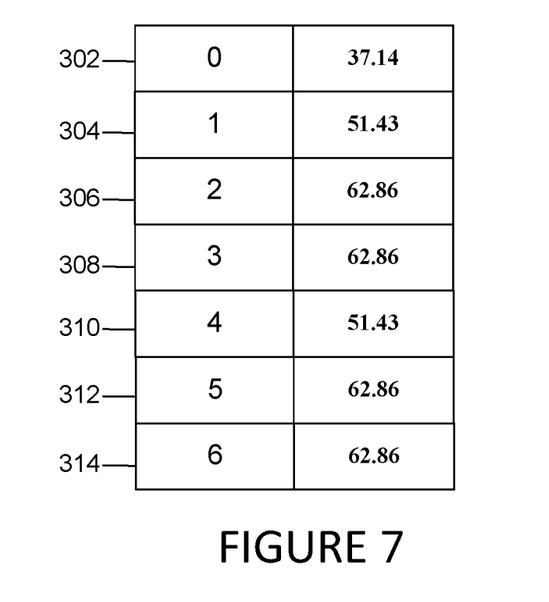
FIG. 7 is a list of scores or values of rows derived from a table.

FIG. 7 illustrates an example of scores or values of rows derived from table 400. Rows with the lowest scores or values will tend to include headers. In this example, the lower scores show row "0" 302, row "1" 304, and row "4" 310. Therefore, row "0" 302, row "1" 304, and row "4" 310 have a greater likelihood of having headers.

Figure 8:
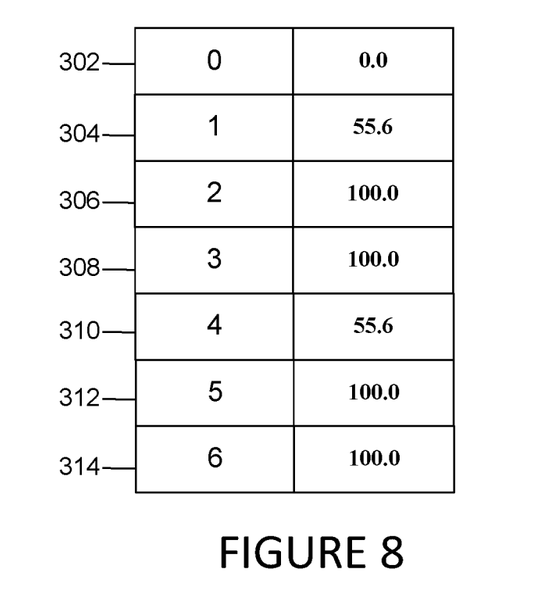
FIG. 8 is a list of scaled scores or values of rows derived from a table.

In certain embodiments, scores and values are scaled. FIG. 8 illustrates and example of a scaled list of scores or values. In this example, row "0" 302, row "1" 304, and row "4" 310 have lower scaled values and have a greater likelihood of having headers. In this example, min-max scaler is used to normalize values between "0" and "1." The values are then multiplied by 100. It is to be understood, that other scaling methods can be implemented.

It is to be understood that similar calculations can be performed as to determining if columns have headers. In such implementations, calculations are performed for each column for all orthogonal rows. Likewise as in the header determination for rows discussed above, the calculated summed scores or values of the columns are compared with one another to determine a relative likelihood if headers exists in a column.

Figure 9:
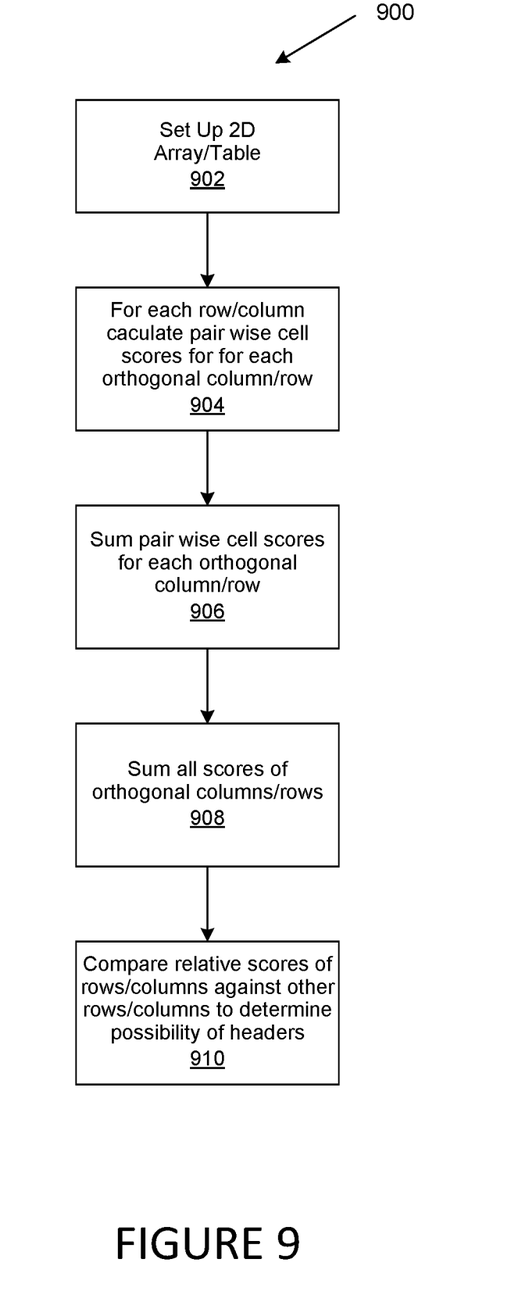
FIG. 9 is a generalized flowchart of the operation of header detection.

Referring to FIG. 9, a flowchart of a data processing flow 900 of a header detection operation is shown. The data processing flow starts at step 902, by setting up or providing a 2D array or table with orthogonal rows and columns. Next at step 904, for each row or column of the table, a pairwise calculation is performed on cells of each corresponding column or row, and a score is derive for each pairwise calculation. Next at step 906, for each corresponding orthogonal column or row, the pairwise comparison scores are summed. Next at step 908, the summed scores for the corresponding orthogonal columns or rows are added to provide a score for the respective row or column. At step 910, the scores for all the rows or columns are tallied and a determination is made as to which rows or columns include headers based on the relative scores of the rows or columns.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method implemented by a knowledge management system for detecting headers in a document, comprising:
   receives input questions;
   parses major features of the input questions that are applied to formulate queries to a corpus of data provided by a content creator; wherein the input questions are received by the content creator from information handling systems; the input questions directed to:
      receiving an html or pdf file and extracting table elements or cells to create dimensional table, wherein data types are identified for the cells;
      performing pair wise comparisons between cells in each orthogonal column or row for each row or column in the two dimensional table that is part of the corpus of data to derive a score as to changes required to derive a value of one cell to the value of the other cell, wherein a score is given as to the changes, for each pair wise comparison, wherein when certain pair wise combinations takes place, dynamic programming is used to call up previously determined cell pair calculations;
      summing the scores of the pair wise comparisons for each orthogonal column or row to derive a summed score;
      summing the summed scores of the orthogonal columns or rows to derive a score for each row or column, wherein the scores are scaled using a min-max scaler to normalized values between 0 and 1; and
      comparing normalized values of each row or column to determine the likelihood of headers.

2. The method of claim 1, wherein:
the pair wise comparison is between a common cell in a row or column and an orthogonal column or row, and each of the other cells in the orthogonal column or row.

3. The method of claim 1, wherein:
the pair wise comparison is a global distance comparison.

4. The method of claim 1, wherein:
the pair wise comparison uses global Levenshtein distance comparison.

5. The method of claim 1, wherein:
the pair wise comparison is based on a feature chosen from a list that includes: data types, fonts styles, text similarity (i.e., edit distance), cell alignments, text indentation, font sizes, font colors, number of characters, percent symbolic characters, percent numeric characters, and percent date/time/year/address/area/money/percentage cells.

6. The method of claim 1, wherein:
performing the pair wise calculation for the same cell pairs implements dynamic programming call up previously determined cell pair calculation.

7. A knowledge manager system comprising:
a processor;
a data bus coupled to the processor; and
a computer-usable medium embodying computer program code, the computer-usable medium being coupled to the data bus, the computer program code used for header detection and comprising instructions executable by the processor and configured for a knowledge manager device to perform the steps of:
receiving input questions;
parsing major features of the input questions that are applied to formulate queries to a corpus of data provided by a content creator; wherein the input questions are received by the content creator from information handling systems; the input questions directed to:
   receiving an html or pdf file and extracting table elements or cells to create dimensional table, wherein data types are identified for the cells;
   calculating pair wise comparisons in a two dimensional table, between cells in each row or column with cells in columns or rows that are orthogonal to each row or column in the two dimensional table that is part of the corpus of data to derive a score as to changes required to derive a value of one cell to the value of the other cell, wherein a score is given as to the changes, for each pair wise comparison, wherein when certain pair wise combinations takes place, dynamic programming is used to call up previously determined cell pair calculations;
   summing for each row or column, pairwise comparison scores of each of the orthogonal columns or rows to derive a summed column or row score;
   adding summed column or rows of the orthogonal columns or rows to derive a value for each row or column, wherein the values are scaled using a min-max scaler to normalized values between 0 and 1;
   performing a relative comparison of the normalized values of each of the rows or columns to determine likelihood of headers in each row or column.

8. The system of claim 7, wherein:
the two dimensional table is derived from a PDF or HTML document.

9. The system of claim 7, wherein:
the two dimensional table includes spanning rows or columns.

10. The system of claim 7, wherein:
the pair wise comparison is a Boolean comparison between cells.

11. The system of claim 7, wherein:
the pair wise comparison is based on a feature chosen from a list that includes: data types, fonts styles, text similarity (i.e., edit distance), cell alignments, text indentation, font sizes, font colors, number of characters, percent symbolic characters, percent numeric characters, and percent date/time/year/address/area/money/percentage cells.

12. The system of claim 7, wherein:
calculating the pair wise calculation for the same cell pairs implements dynamic programming call up previously determined cell pair calculation.

13. A non-transitory, computer-readable storage medium embodying computer program code, the computer program code comprising computer executable instructions configured for a knowledge manager device to perform the steps of:
receiving input questions;
parses major features of the input questions that are applied to formulate queries to a corpus of data provided by a content creator; wherein the input questions are received by the content creator from information handling systems; the input questions directed to:
receiving an html or pdf file and extracting table elements or cells to create dimensional table, wherein data types are identified for the cells;
performing pair wise comparisons between cells in each orthogonal column or row for each row or column in the two dimensional table that is part of the corpus of data to derive a score as to changes required to derive a value of one cell to the value of the other cell, wherein a score is given as to the changes, for each pair wise comparison, wherein when certain pair wise combinations takes place, dynamic programming is used to call up previously determined cell pair calculations;
summing the scores of the pair wise comparisons for each orthogonal column or row to derive a summed score;
summing the summed scores of the orthogonal columns or rows to derive a score for each row or column, wherein the scores are scaled using a min-max scaler to normalized values between 0 and 1; and
comparing normalized values of each row or column to determine the likelihood of headers.

14. The non-transitory, computer-readable storage medium of claim 13, wherein:
the two dimensional orthogonal array is derived from a PDF or HTML file.

15. The non-transitory, computer-readable storage medium of claim 13, wherein:
the pair wise comparison is based on a feature chosen from a list that includes: data types, fonts styles, text similarity (i.e., edit distance), cell alignments, text indentation, font sizes, font colors, number of characters, percent symbolic characters, percent numeric characters, and percent date/time/year/address/area/money/percentage cells.

16. The non-transitory, computer-readable storage medium of claim 13, wherein:
the pair wise comparison is one of Boolean comparison or global Levenshtein distance comparison.

17. The non-transitory, computer-readable storage medium of claim 13, wherein:
the pair wise comparison is between a common cell in a row or column and an orthogonal column or row, and each of the other cells in the orthogonal column or row.

18. The non-transitory, computer-readable storage medium of claim 13, wherein:
the two dimensional orthogonal array includes spanning rows or columns.

19. The non-transitory, computer-readable storage medium of claim 13, wherein the computer executable instructions are deployable to a client system from a server system at a remote location.

20. The non-transitory, computer-readable storage medium of claim 13, wherein the computer executable instructions are provided by a service provider to a user on an on-demand basis.

* * * * *